United States Patent
Dollinger et al.

[11] Patent Number: 6,121,582
[45] Date of Patent: Sep. 19, 2000

[54] HEATING ELEMENTS WITH SWIRL VANES

[75] Inventors: Rainer Dollinger, Dinkelsbühl; Josef Hafner, Schopfloch; Claudia Knost, Dinkelsbühl, all of Germany

[73] Assignee: Werner & Pfleiderer Lebensmitteltechnik GmbH, Dinkelsbuhl, Germany

[21] Appl. No.: 09/294,355

[22] Filed: Apr. 20, 1999

[30] Foreign Application Priority Data

May 6, 1998 [DE] Germany ............................ 198 20 068

[51] Int. Cl.[7] ...................................................... A21B 1/00
[52] U.S. Cl. ............................ 219/400; 219/405; 99/473; 99/474; 99/475
[58] Field of Search ........................................ 219/388, 395, 219/400, 405, 406, 407, 408, 552; 99/386, 443 R, 443 C, 447, 448, 451, 473, 474, 475, 481, 516

[56] References Cited

U.S. PATENT DOCUMENTS 3,631,819 1/1972 Houchman .
3,908,533 9/1975 Fagerstrom et al. ..................... 219/400
4,409,453 10/1983 Smith ....................................... 219/400
4,437,396 3/1984 Plattner et al. ......................... 219/388
4,739,154 4/1988 Bharara et al. ......................... 219/388
5,000,085 3/1991 Archer .................................... 219/400
5,180,898 1/1993 Alden et al. ............................ 219/388
5,204,503 4/1993 Maiellano, Jr. et al. ............... 219/400
5,228,385 7/1993 Friedrich et al. ....................... 219/400
5,423,248 6/1995 Smith et al. ............................ 219/400

FOREIGN PATENT DOCUMENTS 0 526 768 11/1994 European Pat. Off. .
1 373 711 8/1964 France .

*Primary Examiner*—Teresa Walberg
*Assistant Examiner*—Fadi H. Dahbour
*Attorney, Agent, or Firm*—Browdy and Neimark, P.L.L.C.

[57] ABSTRACT

A baking oven comprises a hearth with a baking chamber and a heating device having heating elements which comprise at least one heating surface that constitutes a wall of the baking chamber. Provided in the heating elements is a heating gas duct which is defined on one side towards the baking chamber by the heating surface. Along part of the heating gas duct, turbulence elements are provided in the direction of flow of the heating gas, for the generation of turbulences in the heating gas.

23 Claims, 2 Drawing Sheets

HEATING ELEMENTS WITH SWIRL VANES

BACKGROUND OF THE INVENTION

1. Field of the Invention

The invention relates to a baking oven comprising at lest one hearth with a baking chamber; and a heating device with at least one set of heating elements, which comprises at least one heating surface which forms a wall of a baking chamber, and which comprises at least one heating fluid duct for the guidance of a heating fluid in a direction of flow, each heating fluid duct being defined on at least one side towards a baking chamber by a heating surface.

2. Background Art

In multi-deck tunnel ovens, each baking chamber is heated by heating elements disposed above and below and which form part of the heating device. To this end, a heating gas flows through heating gas ducts which are available in the heating elements and which are substantially vertical to the direction of charging of the baking oven. Since the heating gas, along the heating gas ducts, gives off a considerable part of its energy to the respective baking chamber, a temperature gradient of 30 to 50 K is produced within the baking chamber perpendicular to the charging direction. This temperature gradient strongly affects the quality of the baked products.

SUMMARY OF THE INVENTION

It is an object of the invention to improve a baking oven of the generic type such that as uniform as possible a temperature profile can be maintained within each baking chamber.

This object is attained by turbulence elements being provided along part of each heating fluid duct in the direction of flow for the generation of turbulences in the heating fluid. The gist of the invention resides in that swirl vanes are provided on the heating surfaces in the heating elements so that the laminar boundary layer of the flow of heating gas is interrupted in particular in the rear portion of the heating gas ducts.

Further features, details and advantages of the invention will become apparent from the ensuing description of an exemplary embodiment, taken in conjunction with the drawing.

DESCRIPTION OF THE PREFERRED EMBODIMENT

Figure 1:
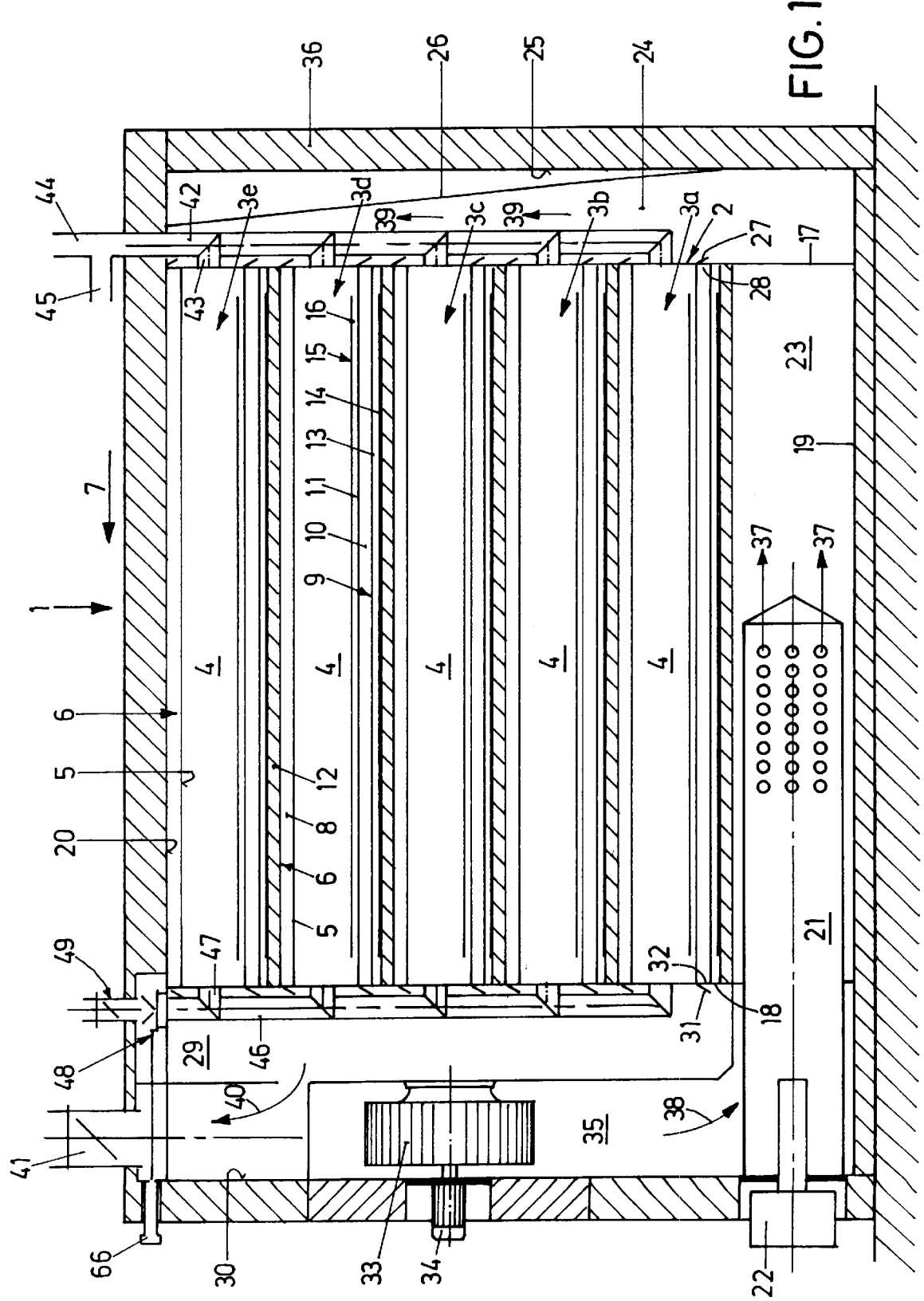
FIG. 1 is a cross-sectional illustration of a multi-deck baking oven.

The baking oven 1 seen in FIG. 1 is a so-called multi-deck tunnel oven, in which a hearth body 2 is provided, comprising five hearths 3a, 3b, 3c, 3d and 3e disposed deck by deck one above the other. Each hearth comprises a baking chamber 4 which is defined at its top side by an upper heating surface 5 formed by a thin sheet and substantially heating only by thermal radiation. This heating surface 5 constitutes part of upper-heat heating elements 6 which comprise heating gas ducts 8 extending horizontally and in the transverse direction 7 of the baking oven 1. On its lower side, each baking chamber 4 possesses bottom-heat heating elements 9 which are structured fundamentally in the same way as the upper-heat heating elements 6 and which likewise comprise heating gas ducts 10 extending horizontally and in the transverse direction 7 and are defined towards the baking chamber 4 by a lower heating surface 11. This heating surface 11 is also formed by a thin sheet.

An intermediate insulator 12 is mounted underneath respective bottom-heat heating elements 9 and at a distance from these, i.e. above the upper-heat heating elements 6 of the next lower hearth 3b to 3e, for the individual hearths 3a to 3e to be thermally insulated from each other as far as possible. Between bottom-heat heating elements 9 and the intermediate insulator 12 thereunder, provision is made for a return channel 13 for the lower strand 14 of a baking conveyor belt 15, the upper strand 16 of which is guided above the lower heating surface 11 of the bottom-heat heating elements 9 of a hearth 3a to 3e through the latter's baking chamber 4. The hearths 3a to 3e are defined by a vertical side wall 17 and a side wall 18, both extending perpendicular to the sectional plane seen in FIG. 1 and being supported and mounted on the bottom 19 and the top 20 of the hearth body 2.

Disposed underneath the lowest hearth 3a is a substantially cylindrical combustion chamber 21 into which opens a burner 22. The combustion chamber 21 is followed by a heating gas mixing chamber 23 which opens into the lowermost end of a heating gas supply channel 24 formed between one side wall 17 of the hearths 3a to 3e and the neighboring outer wall 25 of the hearth body 2. The heating gas supply channel 24 is defined by a limiting wall 26 in addition to the side wall 17, the limiting wall 26 being inclined upwards towards the side wall 17 so that the heating gas supply channel 24 has a cross-section that decreases upwards. The heating gas ducts 8 and 10 of the heating elements 6 and 9 are connected to the heating gas supply channel 24, regulating flaps 27 being provided in each case, by means of which the size of the inlet 28 of the heating elements 6 and 9, respectively, is modifiable.

The heating gas ducts 8 and 10 of all the hearths 3a to 3e discharge into a heating gas collecting chamber 29 which is disposed between the side wall 18 and an associated outer wall 30 of the hearth body 2. Alternatively or cumulatively to the regulating flaps 27 in the respective inlet 28 of the heating gas ducts 8 and 10, regulating flaps 31 of the same design can be provided in the outlets 32 of the heating gas ducts 8 and 10 that open into the heating gas collecting chamber 29. The heating gas collecting chamber 29 discharges into a heating gas blower 33 which is driven by a motor 34. This blower 33 discharges into a heating gas return channel 35, downstream of which is disposed the combustion chamber 21. The top 20, the bottom 19 and the outer walls 25, 30 of the hearth body 2 are thermally insulated by means of an insulator 36.

Corresponding to the arrows of flow direction 37, the hot flue gases produced by the combustion process in the burner 22 flow from the combustion chamber 21 into the heating gas mixing chamber 23. This is where they are mixed with cooled heating gases which are supplied corresponding to the arrows of flow direction 38, whereby heating gas of a corresponding mixed temperature is produced. This heating gas is supplied to the heating elements 6 and 9 through the heating gas supply channel 24 and the inlets 28 corresponding to the arrows of flow direction 39. Due to the suction of the heating gas blower 33, it is sucked through the heating elements 6 and 9, leaving them through the outlets 32. It streams through the heating gas collecting chamber 29 and is then forced by the blower 33 into the heating gas return channel 35, from where—as explained above—it arrives in the combustion chamber 21. To the extent fresh heating gas is supplied by the burner 22 to the mixing chamber 23, cooled heating gases are discharged through a chimney 41 corresponding to the arrow of flow direction 40. The heating gases flow through the heating elements 6 and 9 in a straight line in the transverse direction 7. For the purpose of improved heat transfer, they may also be swirled or deflected by formed pieces disposed in the heating elements 6 and 9.

One vertical supply duct 42 per hearth 3a to 3e is disposed in the vicinity of the heating gas supply channel 24; it emerges upwards and, via a branch duct 43, passes through the side wall 17 into the baking chamber 4 of each hearth 3a to 3e. At its outer end, the supply duct 42 is connected to a vapor supply duct 44 and a fresh air supply duct 45. Through this supply duct 42, each hearth can be provided separately with vapor, i.e. water steam, for the treatment with vapor of the dough products or with fresh air for the purpose of clearing from vapor. In the vicinity of the heating gas collecting chamber 29, discharge ducts 46 are disposed which correspond to the supply ducts 42; by means of a branch duct 47 passing through the side wall 18, they are each connected with the baking chamber 4 of a hearth 3a to 3e. Via shut-off elements 48, the discharge ducts 46 are connected to a vapor discharge chimney 49 which leads to the outside and through which vapor and used air can be discharged outwards.

On the charging side of the baking oven 1 which is positioned against the viewing direction in FIG. 1, provision is made for a customary head member in which deflection of the continuous baking conveyor belts 15 takes place. On the discharging side positioned in the viewing direction in FIG. 1, a tail member is disposed, in which the baking conveyor belts 15 are driven and deflected. The conveying direction of the baking conveyor belt 15 is perpendicular to the sectional plane of FIG. 1 in the viewing direction of the beholder. It is possible to dispose several baking ovens 1 modularly and in alignment one after the other between the head member and the tail member, each baking conveyor belt 15, in this case, extending through the aligned baking chambers 4 of the hearths 3a, 3b, 3c, 3d and 3e allocated to one another in this regard. Flaps are provided on the head and tail element, in the closed condition defining the baking chambers 4 to the front and to the rear, and in the opened condition allowing dough pieces to be supplied and finished baked products to be removed. The supply with dough pieces by the head member on the charging side and the removal by the tail member on the discharging side take place in the way customary and known for multi-deck tunnel ovens.

Figure 2:
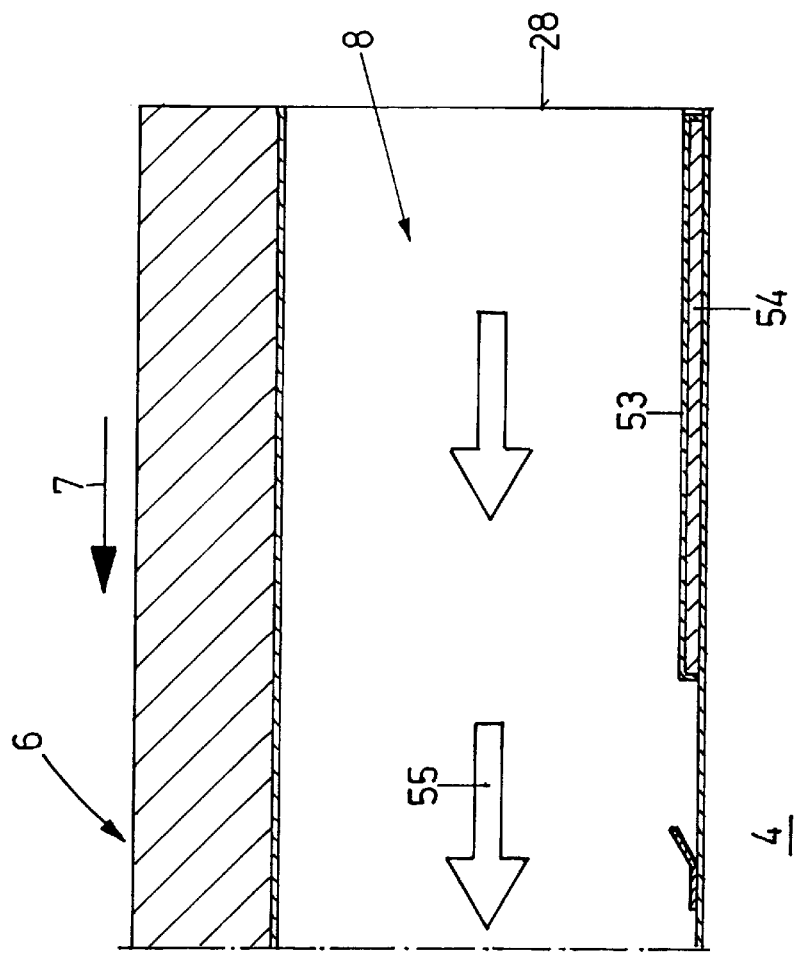
FIG. 2 is a cross-sectional illustration of heating elements according to FIG. 1.

The structure of the heating elements 6 and 9 is going to be described in detail in the following. FIG. 2 illustrates the upper-heat heating elements 6. On the side opposite to the heating surface 5, the heating gas ducts 8 are defined by a duct wall 50 likewise formed by a thin sheet. Contiguous thereto, provision is made for the intermediate insulator 12 as specified above. The width of the heating gas ducts 8 in the viewing direction in FIG. 2 tapers in the transverse direction 7. A reduction of the cross-sectional area of the heating gas ducts 8 in the transverse direction 7 may also be attained by a reduction fo the distance between the heating surface 5 and the duct wall 50, i.e. of the height of the heating gas ducts 8. It is also possible to provide heating gas ducts 8 of a constant cross-section. Along part of the heating surface 5, swirl vanes 51 are provided on the inside of the heating gas ducts 8, having a swirl rib 52 that slopes against the transverse direction 7. The swirl vanes 51 are disposed along a portion, extending from the outlet 32, of the length of the heating gas ducts 8. The fraction of the heating gas ducts 8 along which swirl vanes 51 are disposed depends on the dimensioning of the baking oven 1. An extension over 35 to 75 percent of the length has proved successful in practice. The number of swirl vanes 51 and their distance from each other is equally adjusted to the dimensioning of the baking oven 1. The part of the heating gas ducts 8 that extends from the inlet 28 over 10 to 40 percent of the length and is not provided with swirl vanes 51 comprises an insulating sheet 53 which is disposed on the heating surface 5 and defines a space filled with insulating material 54 relative to the respective heating gas duct 8. Instead of the insulating material or in addition thereto, the insulating sheet 53 can be provided with a thermally insulating coat of paint. The insulating material 54 and the insulating coat of paint can also extend over an insulating sheet 53 section extending in the transverse direction 7 before the inlet 28. Between the swirl vanes 51 and the insulating sheet 53, provision may be made for the heating surface 5 to lie free, not having the mentioned vanes, along 10 to 30 percent of the length of the respective heating gas duct 8. The bottom-heat heating elements 9 are of a design analogous to that of the upper-heat heating elements 6, the swirl vanes 51 and the insulating sheet 53 in this case being disposed on the lower heating surface 11, producing an arrangement that is mirrored along the transverse direction 7 as compared with FIG. 2.

In as much as heating elements 6 and 9 serve for heating a baking chamber 4 disposed directly above and below them, the heating gas ducts 8 and 10 are defined upwards and downwards by heating surfaces 11 and 5, on which swirl vanes 51 and insulating sheets 53 are disposed. Any intermediate insulator 12 is not provided in this case.

Unlike the illustration of FIG. 2, it is possible that the swirl vanes 51 and insulating sheets 53 are not joined tightly to the heating surface 5, but have the form of an insertion element. In the case of the insertion element, the swirl vanes 51 provided in a heating gas duct 8 and 10 and the insulating sheet 53 are united by external ribs that run in the transverse direction 7. This insert can be inserted laterally through the inlets 28 and outlets 32, respectively. In the case of upper-heat heating elements 6, the insert rests on the heating surface 5. In the case of lower-heat heating elements 9, the insert needs a support that will retain it on the lower heating surface 11.

As described above, heating the baking oven 1 is effected by a flow of heating gas. Fundamentally, also the use of hot oil is possible as a heating agent.

As described above, during operation of the baking oven 1, heating gas flows through the inlets 28 into the heating gas ducts 8 and 10 and passes through the ducts in the direction of flow 55, the flow rate increasing as a result of the tapering cross-section. In doing so, the heating gas first passes the area where the heating surface 5 is covered by the insulating sheet 53 so that the dissipation of heat to the adjoining baking chamber 4 is lower than it will be if there is no insulating sheet 53. As soon as the heating gas reaches the swirl vanes 51, zones of turbulence originate above all in the vicinity of the heating surface 5, interrupting the laminar boundary layer of the flow of heating gas on the heating surface 5 and increasing the dissipation of heat of the flow of heating gas to the heating surface 5. Due to the arrangement described above, the temperature profile in the transverse direction 7 can be kept constant in the baking chamber, fluctuating only by few degrees kelvin, as a result of which the baked products fed or picked in a direction perpendicular to the transverse direction 7 can be baked uniformly.

What is claimed is:

1. A baking oven comprising
   a) at least one hearth with a baking chamber; and
   b) a heating device including at least one set of heating elements,
      i) which comprises at least one heating surface for heating the baking chamber substantially by thermal radiation, the at least one heating surface forming a wall of a baking chamber, and
      ii) which comprises at least one heating fluid duct for the guidance of heating fluid in a direction of flow;
      iii) each heating fluid duct being defined on at least one side towards a baking chamber by a heating surface, said heating surface separating said baking chamber from the heating fluid; wherein
   c) along part of each heating fluid duct, turbulence elements are provided in the direction of flow for the generation of turbulences in the heating fluid.

2. A baking oven according to claim 1, wherein the heating duct is substantially straight and disposed transversely to the direction of charging of the baking oven.

3. A baking oven according to claim 1, wherein at least one set of heating elements comprises a first heating surface and a second heating surface defining a heating fluid duct, the first heating surface forming a wall of a first baking chamber and the second heating surface forming a wall of a second baking chamber.

4. A baking oven according to claim 1, wherein at least one set of heating elements comprises a thermal insulator on a side opposite to the heating surface.

5. A baking oven according to claim 1, wherein the heating fluid is one of a heating gas and a heating oil.

6. A baking oven according to claim 1, wherein the cross-section of flow of each heating fluid duct tapers in the direction of flow.

7. A baking oven according to claim 1, wherein the turbulence elements are provided on each heating surface.

8. A baking oven according to claim 1, wherein the turbulence elements are swirl vanes sloping against the direction of flow.

9. A baking oven according to claim 1, wherein the turbulence elements are disposed substantially along a rear part, seen in the direction of flow, of each heating fluid duct.

10. A baking oven according to claim 1, wherein the turbulence elements are disposed substantially along 35 to 75 percent of the length of each heating fluid duct.

11. A baking oven according to claim 1, wherein the turbulence elements are combined by at least one rib extending in the direction of flow, forming an insert to be inserted into each heating fluid duct.

12. A baking oven according to claim 1, wherein the turbulence elements are one of united with the heating surface, resting on the heating surface, and retained on the heating surface by a support.

13. A baking oven comprising:
    a) at least one hearth with a baking chamber; and
    b) a heating device including at least one set of heating elements,
       i) which comprises at least one heating surface forming a wall of a baking chamber; and
       ii) which comprises at least one heating fluid duct for the guidance of heating fluid in a direction of flow;
       iii) each heating fluid duct being defined on at least one side towards a baking chamber by a heating surface; wherein
    c) along part of each heating fluid duct, turbulence elements are provided in the direction of flow for the generation of turbulences in the heating fluid;
    d) wherein at least one set of heating elements comprises a first heating surface and a second heating surface defining a heating fluid duct, the first heating surface forming a wall of a first baking chamber and the second heating surface forming a wall of a second baking chamber.

14. A baking oven according to claim 13, wherein the heating fluid duct is substantially straight and disposed transversely to the direction of charging of the baking oven.

15. A baking oven according to claim 13, wherein at least one set of heating elements comprises a thermal insulator on a side opposite to the heating surface.

16. A baking oven according to claim 13, wherein the heating fluid is one of [1] a heating gas and [2] a heating oil.

17. A baking oven according to claim 13, wherein the cross-section of flow of each heating fluid duct tapers in the direction of flow.

18. A baking oven according to claim 13, wherein the turbulence elements are provided on each heating surface.

19. A baking oven according to claim 13, wherein the turbulence elements are swirl vanes sloping against the direction of flow.

20. A baking oven according to claim 13, wherein the turbulence elements are disposed substantially along a rear part, seen in the direction of flow, of each heating fluid duct.

21. A baking oven according to claim 13, wherein the turbulence elements are one disposed substantially along 35 to 75 percent of the length of each heating fluid duct.

22. A baking oven according to claim 13, wherein the turbulence elements are combined by at least one rib extending in the direction of flow, forming an insert to be inserted into each heating fluid duct.

23. A baking oven according to claim 13, wherein the turbulence elements are one of [1] united with the heating surface, [2] resting on the heating surface and [3] retained on a heating surface by a support.

* * * * *